United States Patent
Nekovee et al.

(10) Patent No.: US 7,526,523 B2
(45) Date of Patent: Apr. 28, 2009

(54) TIMER-BASED FEEDBACK IN MULTICAST COMMUNICATION

(75) Inventors: Maziar Nekovee, Kesgrave (GB); Sverrir Olafsson, Ipswich (GB)

(73) Assignee: British Telecommunications public limited company, London (GB)

( * ) Notice: Subject to any disclaimer, the term of this patent is extended or adjusted under 35 U.S.C. 154(b) by 946 days.

(21) Appl. No.: 10/517,652

(22) PCT Filed: Jun. 12, 2003

(86) PCT No.: PCT/GB03/02530

§ 371 (c)(1),
(2), (4) Date: Dec. 13, 2004

(87) PCT Pub. No.: WO04/002048

PCT Pub. Date: Dec. 31, 2003

(65) Prior Publication Data

US 2005/0207354 A1  Sep. 22, 2005

(30) Foreign Application Priority Data

Jun. 21, 2002  (EP)  .................................. 02254355

(51) Int. Cl.
*G06F 15/16* (2006.01)
(52) U.S. Cl. ........................................ 709/204; 709/230
(58) Field of Classification Search .................. 709/204
See application file for complete search history.

(56) References Cited

U.S. PATENT DOCUMENTS

| | | | | |
|---|---|---|---|---|
| 6,076,114 A | * | 6/2000 | Wesley | 709/235 |
| 6,084,858 A | * | 7/2000 | Matthews et al. | 370/238 |
| 6,778,531 B1 | * | 8/2004 | Kodialam et al. | 370/390 |
| 7,102,998 B1 | * | 9/2006 | Golestani | 370/235 |
| 2003/0037159 A1 | * | 2/2003 | Zhao et al. | 709/232 |

OTHER PUBLICATIONS

Nonnemacher et al., "Optimal Multicast Feedback", INFOCOM '98. Seventeenth Annual Joint Conference of the IEEE Computer and Communications Societies. Proceedings. IEEE San Francisco, CA., USA Mar. 29-Apr. 2, 1998, New York, NY, USA IEEE, US pp. 964-971.

Youssef et al., "Controlling Quality of Session in Adaptive Multimedia Multicast Systems", Network Protocols, 1998, Proceedings. Sixth International Conference on Austin, TX, USA 13-16 October 19998, pp. 160-167.

Nonnenmacher et al., "Scalable Feedback For Large Groups", IEEE / ACM Transactions on Networking, IEEE Inc., New York, US, vol. 7, No. 3, Jun. 1999, pp. 375-386, XP000834489, ISSN: 1063-6692.

(Continued)

*Primary Examiner*—Patrice Winder
*Assistant Examiner*—Minh-Chau Nguyen
(74) *Attorney, Agent, or Firm*—Nixon & Vanderhye PC (57) ABSTRACT

A multicast system is described in which a mechanism for suppressing feedback involves the receivers using an optimized timer function for selecting a backoff delay time before sending feedback, and canceling their feedback if in the meantime they detect that another receiver has sent a duplicate feedback message. The timer function is optimised, taking into account both the expected number of feedback messages and the extra latency which is introduced by the feedback mechanism, by minimizing an objective function expressed in terms of both these two aspects.

17 Claims, 6 Drawing Sheets

OTHER PUBLICATIONS

Anderson et al., "NACK-Oriented Reliable Multicast (NORM) Protocol Building Blocks", Internet Draft of the Internet Engineering Task Force, draft-ietf-rmt-bb-norm-03, Nov. 2001.

Miller, "Reliable Multicast Protocols and Applications", The Internet Protocol Journal, vol. 1, No. 2, Sep. 1998, pp. 19-37.

* cited by examiner

TIMER-BASED FEEDBACK IN MULTICAST COMMUNICATION

This application is the US national phase of international application PCT/GB2003/002530 filed 12 Jun. 2003 which designated the U.S. and claims benefit of EP 02254355.7, dated 21 Jun. 2002, the entire content of which is hereby incorporated by reference.

FIELD OF TECHNOLOGY

This invention relates to a timer-based approach for supressing feedback during data transmission, and in particular but not exclusively to reliable multicast communication.

BACKGROUND

Figure 1:
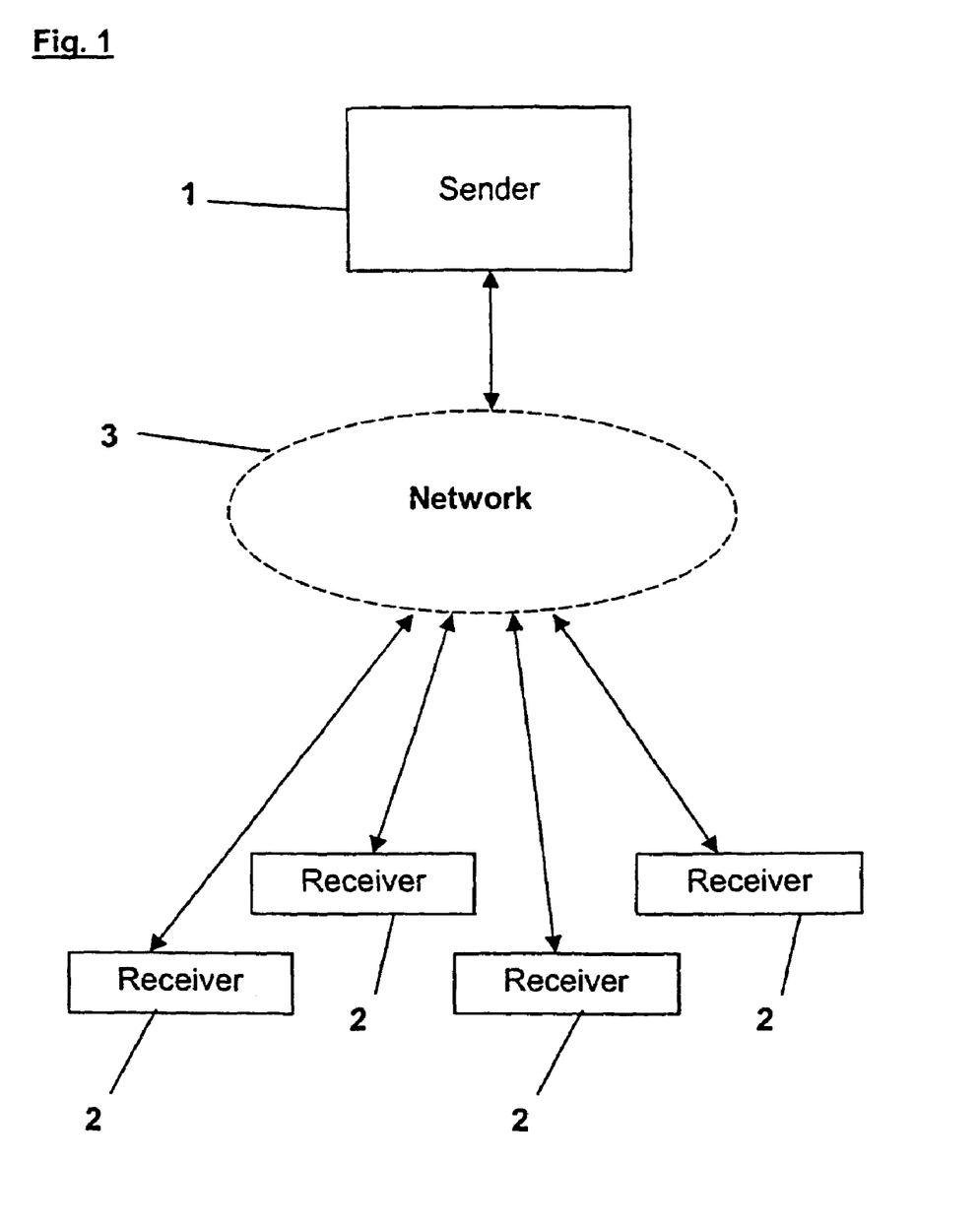
FIG. 1 is a schematic drawing showing multicast transmission.

Multicast communication can be used for the transmission of data in both a one-to-many situation (for example multimedia applications, tickertape feeds or bulk file transfer) or the many-to-many communication of data (for example conferencing or network gaming), and is increasingly gaining in importance with the deployment of multicast in the internet and with the increasing number of satellites. In FIG. 1, the schematic overview of a one-to-many multicast system, a sender 1 communicates data over a network 3 to a plurality of receivers 2. The network 3 could be any suitable network, such as for example, the internet, a local area network (LAN), satellite network, etc. The number of receivers 2 will depend on the particular multicast application, from just a few to possibly even millions of receivers, such as for cable-TV delivery, satellite or other wireless communication services. The number of receivers 2 also varies dynamically during a multicast transmission as receivers leave or join the multicast group.

In reliable multicast, used to guarantee the delivery of data to a group of receivers, feedback messages (FBMs) are returned from the receivers to either acknowledge correct receipt of data (positive acknowledgement messages known as ACKs), or loss of data (negative acknowledgement messages known as NACKs). In reliable multicast, therefore, a large group of receivers can generate a large number of feedback messages. If the multicast group size grows, the number of potential feedback messages to the sender can increase linearly, and can eventually overwhelm the sender's capacity to handle them (known as feedback implosion). Feedback implosion can cause problems due to the high concentration of network traffic at the sender, wasted bandwidth and/or high processing requirements. Feedback implosion therefore limits the ability of multicast transmission to scale to very large groups and is a major problem in reliable multicast technology.

In reliable multicast protocols which only use NACKS, a single feedback message received by the sender will be sufficient to initiate re-transmission of lost data. All other duplicate NACKs generated by the receivers are redundant and must be suppressed if feedback implosion is to be avoided. A known solution to the problem of feedback implosion involves receivers delaying before issuing repair requests (i.e. NACKs). If, in the meantime a receiver detects the same repair request has been made by another receiver then it will suppress its own repair request and stay silent. Thus, the duplication of repair requests is avoided. Each receiver can select at random the time for delaying it's repair request (known as the "backoff" time) from a timer probability distribution function, as is described below.

When a sender sends a request for feedback to the receivers, included with the request are parameters $\{\alpha\}$ and T (the timer period) for a timer probability distribution function $f^i(t)$, $t \in [0,T]$, $i=1, \ldots, R$, where R is the number of receivers. (Note: the timer period T determines the time after which the backoff time periods for all receivers will have expired.) Upon receiving the request from the sender (at time $\tau^j$), a receiver j which detects a data loss samples a backoff time $t^j$ from the given timer distribution function $f^j$. For example, to sample a backoff time $t^j$ from an exponential timer distribution having parameters T and $\{\alpha\}=\lambda$ involves using a uniform random number generator to generate uniform random $t^u$ between 0 and 1, and then sampling $t^j$ from the exponential distribution as follows (the so-called inversion method), $$t^j = \left(\frac{T}{\lambda}\right)\ln(1 + (e^\lambda - 1) \times t^u)$$

Receiver j waits until time $\tau^j + t^j$ before sending its feedback to the sender, and will suppress its feedback if in the meantime it has received a duplicate feedback message (FBM) from another receiver.

Such a timer-based scheme for multicast feedback has been described by J. Nonnenmacher & E. W. Biersack in "Scaleable Feedback for Large Groups" (IEE\ACM Trans. Networking, vol 7, pp 375-386, June 1999). Nonnenmacher and Biersack discussed probabilistic feedback methods in relation to three different forms of timer function: a uniformly distributed timer function, beta-distributed timer function and exponentially distributed timer function. Comparisons of the three timer functions concluded that the best feedback suppression was achieved using the exponentially distributed timer function.

However, one problem with the timer-based approach described above to suppress multicast feedback is that an extra latency is introduced (i.e. extending the period of time taken before the sender receives the first repair request), due to the random times that the receivers delay their responses. There exists a trade-off between the data delivery latency versus the amount of NACK suppression (and consequently the ability to scale the multicast to a larger group). Accordingly, a timer distribution function suitable for use with one particular multicast application may be entirely unsuitable for use with another multicast application, due to the varying scalability and latency requirements. For example, multimedia applications can require both scalability and low latency. Low latency is also a requirement for collaborative applications such as data-conferences (whiteboarding), although the scaling requirements are more modest (less than 100 participants). Collaborative applications like this will require, for example, latency of less than 400 msec so that responses do not cause discomfort to the human participants. Message streaming applications such as tickertape and news feeds often require both low latency and scalability to thousands (or possibly millions) of receivers. Tickertape feeds to brokerage houses need to be particularly timely because the information loses value greatly as time passes, and there is also the need for strict reliability.

In contrast, bulk data delivery may have no specific latency requirement, and can be scheduled for delivery during the night when the traffic on a network is reduced. Strict reliability is usually the main concern for this application, with the need to ensure that a complete set of data is transferred correctly. However, even in bulk data delivery applications, it can sometimes be necessary to receive the data almost immediately, and therefore the latency requirements can vary widely.

SUMMARY

According to a first aspect of the present invention, there is provided a method for selecting a value of one or more parameters of a timer function for use by a receiver for delaying feedback in a multicast system, the method comprising: finding the one or more parameter values which minimise an expression defined as a function of the parameters, the expression comprising at least two terms, where one term relates to the expected number of feedback messages generated by receivers in the multicast system and the second term relates to the expected extra latency of the feedback due to the timer function. During multicast, the receiver can then delay sending a feedback message by a time period determined in relation to the timer function, and in the event that the receiver detects during the time period that a substantially duplicate feedback message was sent by another receiver then cancel sending its own feedback message.

According to a second aspect of the present invention, there is provided a method for selecting a timer function for use by a receiver for delaying feedback in a multicast system, the method comprising the steps of: for each of at least two timer functions, minimising with respect to one or more parameters of the timer function an expression comprising at least two terms, where one term relates to the expected number of feedback messages generated by receivers in the multicast system and the second term relates to the expected extra latency of the feedback due to the timer function; and comparing the values of the minimized expressions for the timer functions.

Embodiments of the invention advantageously allow an optimum timer function to be chosen for use in a multicast feedback mechanism, taking into account both the feedback and latency requirements for the multicast. In the first case, parameters are selected to optimize an already-decided form of timer function. In a second case, the method is used to simultaneously optimize and select one of a number of different forms of timer function.

These advantageously provide a feedback suppression mechanism which will provide good performance across a wide range of different multicast applications having different latency and scalability requirements.

The expression may also include means for weighting the relative importance of the first and second terms, i.e. the NACK suppression requirements versus the latency constraints. The relative weighting of these two terms can therefore be modified for different multicast applications to reflect different situations in which, for example, the latency constraint may be more or less important, and to calculate an optimum timer function accordingly.

The second term (relating to the extra latency due to the timer-based feedback mechanism) may take the form of a function which has a maximum gradient corresponding to where the extra latency reaches a predefined maximum acceptable limit. A minimised solution to the expression is therefore forced to lie below this point, namely where the latency is less than the maximum acceptable value. This advantageously allows a solution to be found in which the extra latency does not exceed a predefined limit, which can be set for example by a user or stored within the multicast system.

Furthermore, the embodiments may also include the step of recalculating the optimised parameters (in/or reselecting a timer function) in response to changes in multicast conditions. Advantageously, this means that a timer function optimised for specific multicast conditions (e.g. for a particular multicast group size, etc) can be dynamically changed in response to changes in the multicast conditions. This helps to ensure that the feedback suppression mechanism in use is the best one for the current conditions. This can either be achieved by dynamic re-optimisation during run-time, or alternatively by selecting pre-calculated optimum parameters from a stored lookup table.

Embodiments may use as the timer distribution function, a shifted power law timer of the form $$f_{SPL}(t) = \begin{cases} \frac{b}{T} + (1-b)\frac{a}{T}\left(\frac{t}{T}\right)^{a-1}; & 0 \leq t \leq T \\ 0; & \text{otherwise} \end{cases}$$

which provides improved performance over previously known timer functions such as the exponential timer function.

BRIEF DESCRIPTION OF DRAWINGS

For a better understanding of the present invention specific embodiments will now be described, by way of example, with reference to the accompanying drawings, in which:

FIGS. 4(a) and (b) are graphs showing the expected performance of two optimised timer functions in reliable multicast;

DETAILED DESCRIPTION

As discussed earlier, in a NACK (negative acknowledgement) oriented repair mechanism, a receiver uses the timer probability distribution function $f=f(t,\{\alpha\})$ from which to select a backoff delay time before sending a data repair request (i.e. a NACK). If in the meantime (during the delay period), the receiver detects that the same repair request has already been made then it will suppress its own repair request, thereby preventing feedback implosion. Parameters $\{\alpha\}$ for the timer function, and also possibly an indication of which timer function the receivers are to use, are sent to the receivers in multicast messages transmitted from the sender.

In an ideal situation where the delay between the sending of a feedback message (FBM) by one receiver and its arrival at another receiver is negligible (and there is no loss of packets), the FBM of the receiver whose backoff timer expires first will suppress the feedback of all other receivers. Thus only one FBM would reach the sender in each round. In practice, however, delay in the network results in a larger number of FBMs being generated during each round. Furthermore, in order to make the feedback (as well as the suppression mechanism) robust against loss of FBMs it is actually desirable that more that one FBM per round is returned to the sender.

A mathematical model of the timer-based feedback mechanism is developed below, in which the delay times between sender and the receivers and among receivers themselves are deterministic and are homogeneously distributed.

Two performance measures which are considered are the expected number of NACK feedback messages E[X] and the excess latency due to the feedback mechanism E[M]. The excess latency is the time delay which is additional to the usual network delay time c for a data packet to travel from a receiver to the sender, and corresponds to the expected time for the expiry of the first timer. We consider a situation where there are R receivers in the multicast group. The number of receivers that are potential NACK senders depends on the loss in the network and can vary strongly with the network and multicast tree topology. For example in the so-called fanout topology the loss on any link affects only one receiver (there is no spatial correlation in losses) and, assuming a constant loss probability q for each link, the expected number of potential NACK senders is $\hat{R}=qR$. On the other hand, in a linear chain topology there is maximum spatial correlation in losses and the number of potential NACK senders (for the same loss probability q) is $\hat{R} \approx (1-(1-q)^R)R$, which quickly approaches R for even very modest loss probabilities. The expected number of NACK senders in a real system should be between these two extreme cases, and can be evaluated exactly using the probability distribution for the number of losses per multicast round. However, in this case we consider a worst-case scenario in which all receivers are potential NACK senders.

Under the assumption that all delays are deterministic, E[X] and E[M] can be written as functionals of the timer probability distribution function $f^i(t)$ and the corresponding cumulative timer probability distribution function $F^i(t)$ where $$f^i(t) = \frac{dF^i}{dt}.$$

Defining the Bernoulli random variable $X_i$ which describes whether the FBM from receiver i is sent ($X_i=1$) or not sent ($X_i=0$) and assuming a network delay time c (a constant one-way delay between the sender and the receivers and among receivers themselves), the probability for receiver i sending a feedback is given by:

$$P(X_i = 1) = \int_c^{T+c} dt f^i(t-c) \prod_{j \neq i} (1 - F^j(t-2c)).$$

where the first term in the integrand gives the probability that the timer at sender i will expire during the interval [t−c,t−c+ dt], while the second term is the probability that the timer at all receivers will expire later than t−2c.

The expected number of feedback messages is then given by $$E[X] = \sum_{i=1}^{R} P(X_i = 1)$$

$$= \sum_{i=1}^{R} \int_c^{T+c} dt f^i(t-c) \prod_{j \neq i} (1 - F^j(t-2c))$$

$$= \sum_{i=1}^{R} \int_0^T dt f^i(t) \prod_{j \neq i} (1 - F^j(t-c))$$

The excess latency due to the feedback mechanism is the expected time before the first timer expires. Defining a random variable M, which describes the expiry time of the first timer $M=\min\{t^1, t^2, \ldots t^R\}$, the expected excess latency can be expressed as $$E[M] = \int_0^T dm \prod_{i=1}^{R} (1 - F^i(m))$$

For constant sender-receiver and receiver-receiver delays all receivers use the same timer distribution function $f^i(t)=f(t)$, and the expressions for E[X] and E[M] simplify to $$E[X] = R \int_0^T dt f(t)(1 - F(t-c))^{R-1}$$

$$= RF(c) + \int_C^T dt f(t)(1 - F(t-c))^{R-1}$$

$$E[M] = \int_0^T dt(1 - F(t))^R$$

where we have made use of the property F(t−c)≡1 for t≦c. We note that the first term in the expression for E[X] is just the average number of receivers whose NACKs cannot be cancelled by the suppression mechanism since they were sent within the network delay time c. It provides a lower bound to minimum number of NACKS that can be achieved with a given timer distribution function.

We now define a general objective function Ω in terms of E[X] and E[M] as

Ω=E[X]+wΘ(E[M])

where w is a weight and Θ(E[M]) is a suitably chosen function relating to the excess latency. Minimization of the objective function Ω therefore optimizes the parameterised timer function in relation to simultaneously minimizing both the number of expected NACK feedback messages and the excess latency due to the feedback mechanism, and is used within the embodiments of the invention as described in relation to FIGS. 2-7.

The chosen function Θ(E[M]) relating to excess latency is $$\Theta(E[M]) = 1 - \frac{1}{1 + \exp(\gamma(E[M] - E^0[M]))}$$

a monotonic function increasing with E[M], which tends to 0 for E[M]<E⁰[M] (where E⁰[M] is the maximum acceptable excess latency), tends to unity for E[M]>E⁰[M] and rises sharply at E⁰[M]. Accordingly, by selecting the weighting term w>>0, minimisation of the function Ω will correspond to NACK minimization under the latency constraint E[M]≦E⁰[M]. Since the steepest gradient is provided around the region E[M]=E⁰[M], this restricts the solution to one which satisfies the constraint E[M]≦E⁰[M]. Parameter γ>0, (typically set to 5) can be used to adjust the "softness" of the constraint, i.e. to tune how close E[M] gets to $E_0$[M] (the larger γ the closer).

Figure 2:
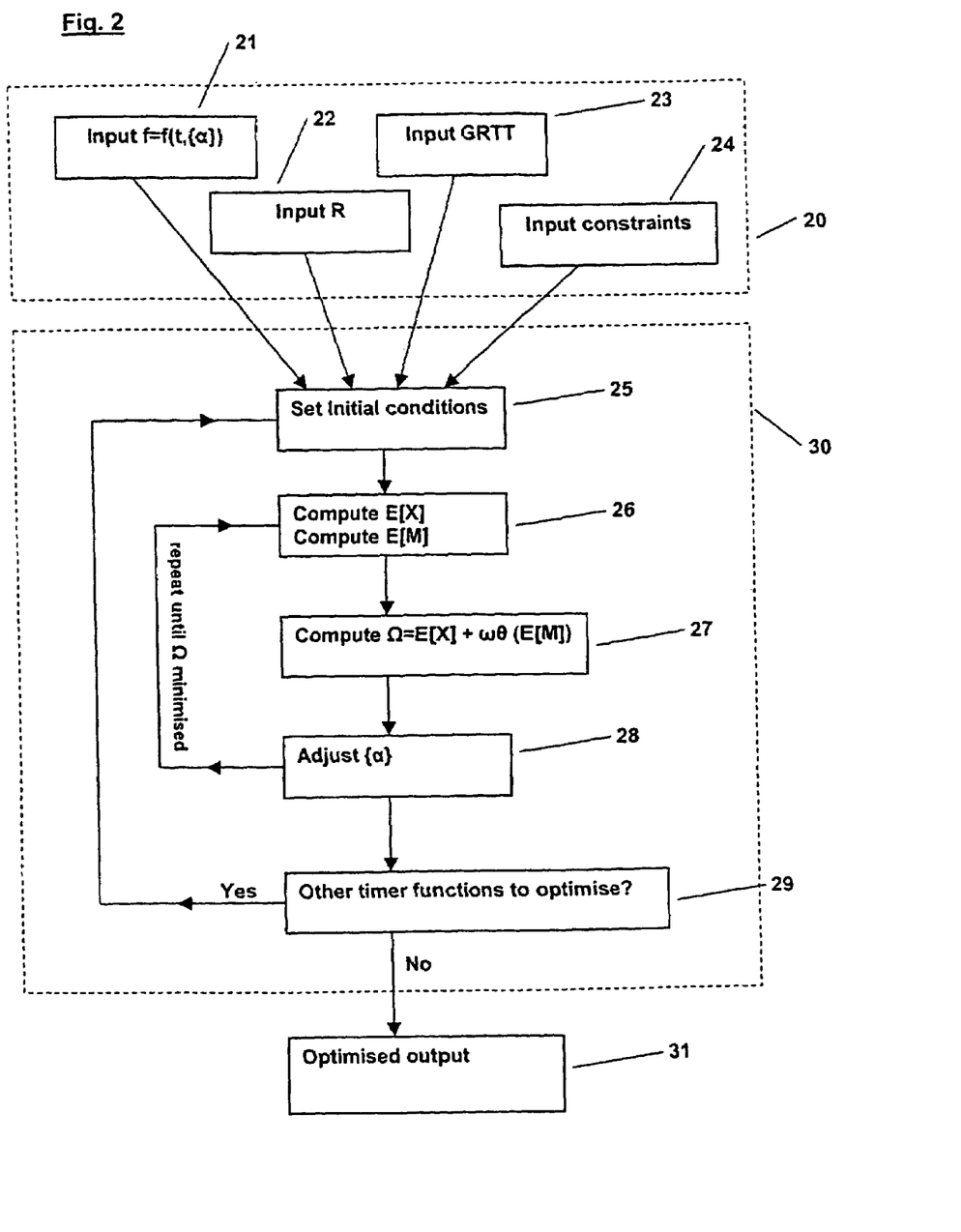
FIG. 2 is a flowchart showing the steps for optimising a parameterised timer function for use in NACK suppression for reliable multicast, in accordance with embodiments of the invention.
Figure 3:
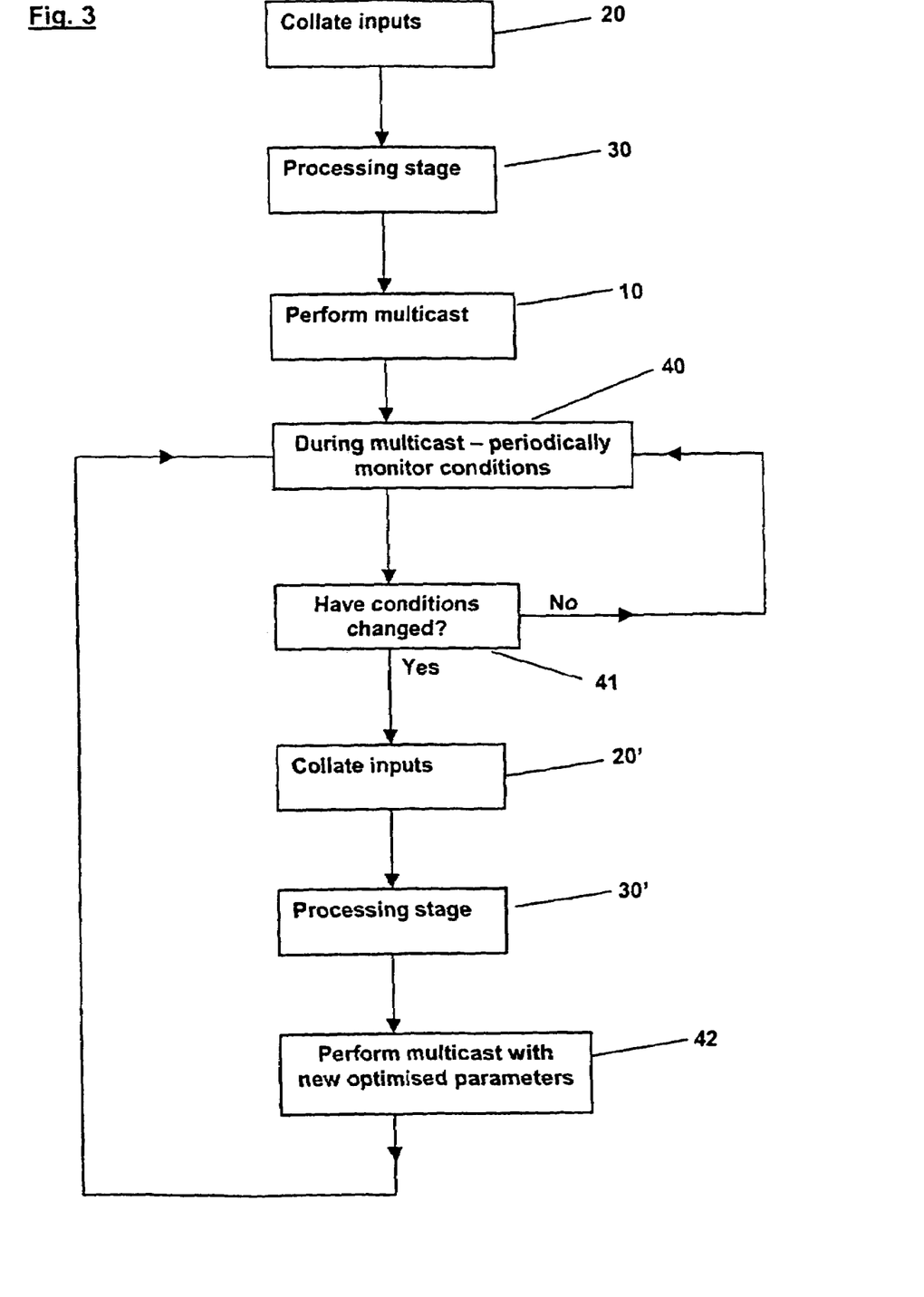
FIG. 3 is a flowchart showing the steps peformed by a multicast system, according to a first embodiment of the invention.

Referring to FIGS. 2 and 3, a first embodiment according to the invention comprises a multicast system which operates using minimization of the objective function Ω described above. A multicast sender initially collates inputs 20 electronically which are to be used during processing stage 30. A first input 21 is the explicitly parameterized timer distribution function $f=f(t,\{\alpha\})$ which will be used by the receivers for feedback suppression, and may be obtained, for example from a suitable electronic storage device (not shown) in the sender. A second input 22 is an estimate of R, the number of receivers in the multicast group. This may either be a predicted value for R if the multicast transmission has not yet commenced, or alternatively may be the current estimate of R maintained and updated by the sender during multicast using techniques which will be known to the person skilled in the art (but are beyond the scope of this application). Input 23 is an estimate of the GRTT (greatest network round trip time), which may also be either a predicted value or the currently maintained value for GRTT during multicast. Input 24 comprises any other relevant constraints, such as latency or feedback requirements specific to the multicast application, for example, the maximum acceptable excess latency E⁰[M].

All the inputs 20 are fed electronically into the processing stage 30 which will be performed by a processor (not shown) in the sender. The first processing step 25 is the setting of initial conditions (based on the inputs). For example, step 25 will include setting the weighting term w to an appropriate value such as 3 ln(R) (as discussed later), and setting the timer period T based on GRTT (which fore the approximation of homogeneous network delay times, is equivalent to 2c, c being the one-way network delay time). In fact, T should be set to be larger than c, to ensure that not all the receivers backoff timers expire before the first NACK is received by the sender or other receivers. A suitable value for T is of the order of T=5c.

Optimisation commences at step 26 by computing values for E[X] and E[M], and at step 27 the objective function Ω is computed. At step 28 the parameters of the timer function are adjusted iteratively and steps 26-28 repeated until the optimum solution has been reached (i.e. the objective function Ω has been minimised). So far as has been described to this point, only a single timer distribution function $f=f(t,\{\alpha\})$ has been optimised. However, if more than one timer function were input at step 21 then the check at step 29 for other timer functions is positive, and processing stages 25-28 are repeated to optimise each additional timer function. After this, the optimised solution is output at step 31. The output for a single input timer function will comprise the optimized parameter settings $\{\alpha\}_{opt}$ to be used in that timer function. Alternatively, for a plurality of input timer functions the optimum solution will be selected by direct comparison of the minimized values of Ω for each timer, and an indication of the selected timer function will be output together with the relevant optimised parameters for that timer function.

Computation as described during steps 26-28 is performed using numerical integration methods (Gaussian integration is used for efficiency) combined with known minimisation techniques. The objective functional Ω is in this way turned into a multivariable function of the parameters $\{\alpha\}$ and minimised with respect to variations in these parameters using standard known minimization software such the MINPACK, free software written by researchers at Argon National Laboratories, USA and available online from http://www-fp.mcs.anl.gov/otc/minpack/summary.html. This numerical approach, with direct minimization of the objective function Ω allows the generalization to different timer distribution functions, instead of using an analytical approach which restricts the optimization to specific timers.

The optimised output at step 31 then forms part of the multicast messages transmitted by the sender during multicast at step 10 (see FIG. 3). During multicast, the sender periodically monitors the multicast conditions (step 40). For example, the sender maintains updated information relating to the group dynamics such as the size of the group (number of receivers, R) or the greatest round trip time GRTT. At step 41, a test is applied to determine whether specific multicast condtions have changed (for example, whether the group size R has increased by a predefined amount). If not, processing returns to step 40 until the next periodic check is performed during multicasting. However, if multicast conditions have changed then re-optimisation of the timer function will occur as follows. Updated inputs (including the new multicast conditions such as the new group size R') are collated at stage 20' and fed electronically into processing stage 30'. Processing stage 30' then repeats the optimisation of the timer function(s) in the same manner as described earlier with reference to stage 30 (FIG. 2). A revised optimum solution is calculated and output for use in the next multicast round (step 42).

As described in the multicast system according to a first embodiment of the invention, the optimisation method incorporates both NACK minimisation requirements and latency constraints, both taken into account in the objective function Ω, and can be adapted to reflect specific multicast requirements by changing the input constraints (step 24). The inputs at step 24 will affect the initial conditions set at step 25 and can therefore change the form of the objective function Ω as appropriate. For example, in a first multicast situation the input constraints might indicate that minimum NACK feedback is required under a condition of maximum tolerable excess latency E⁰[M]. In this case, the objective function will include the second term Θ(E[M]) relating to excess latency of $$\Theta(E[M]) = 1 - \frac{1}{1 + \exp(\gamma(E[M] - E^0[M]))}$$

as described earlier. Corresponding settings for γ and w will be γ=5 and w>>0. A suitable value for w would be C ln(R), (where C is a constant around 3) which maintains the two terms in Ω roughly of the same order since the expected feedback grows with ln(R). Minimization of the objective function will find a solution under which the expected excess latency should not exceed the threshold E⁰[M]. A timer function optimized in this way is therefore ideally suited for use in a multicast situation where it is important to maintain a particular latency requirement. One example is data-conferencing in which the latency should be kept low to avoid inconvenience to the human participants.

Alternatively, in a second type of multicast situation, such as bulk file transfer, minimum NACK feeback might be required but there is no latency constraint. In this case, w can be set to 0 thus rendering the second term Θ(E[M]) irrelevant.

Minimisation will proceed on the basis of $\Omega = E[X]$ alone, i.e. only in respect of feedback suppression.

Thirdly, optimization might be required in respect of simultaneously minimizing the number of NACKs and the excess latency, but where there are no specific constraints on either. In this case, the weighting term could be set at w>0, and $\Theta(E[M])$ replaced simply by $E[M]$.

Two examples of timer probability distribution functions $f=f(t,\{\alpha\})$ which are used in the multicast system described earlier are: a shifted power-law (SPL) timer of the form $$f_{SPL}(t) = \begin{cases} \frac{b}{T} + (1-b)\frac{a}{T}\left(\frac{t}{T}\right)^{a-1}; & 0 \le t \le T \\ 0; & \text{otherwise} \end{cases}$$

where both a and b are adjustable parameters; and a truncated exponential timer (EXP) of the form $$f_{EXP}(t) = \begin{cases} \frac{1}{\exp(\lambda)-1}\left(\frac{\lambda}{T}\right)\exp\left(\frac{\lambda}{T}t\right); & 0 \le t \le T \\ 0; & \text{otherwise} \end{cases}$$

where $\lambda$ is an adjustable parameter. For both timers, T is the timer period.

Figure 4:
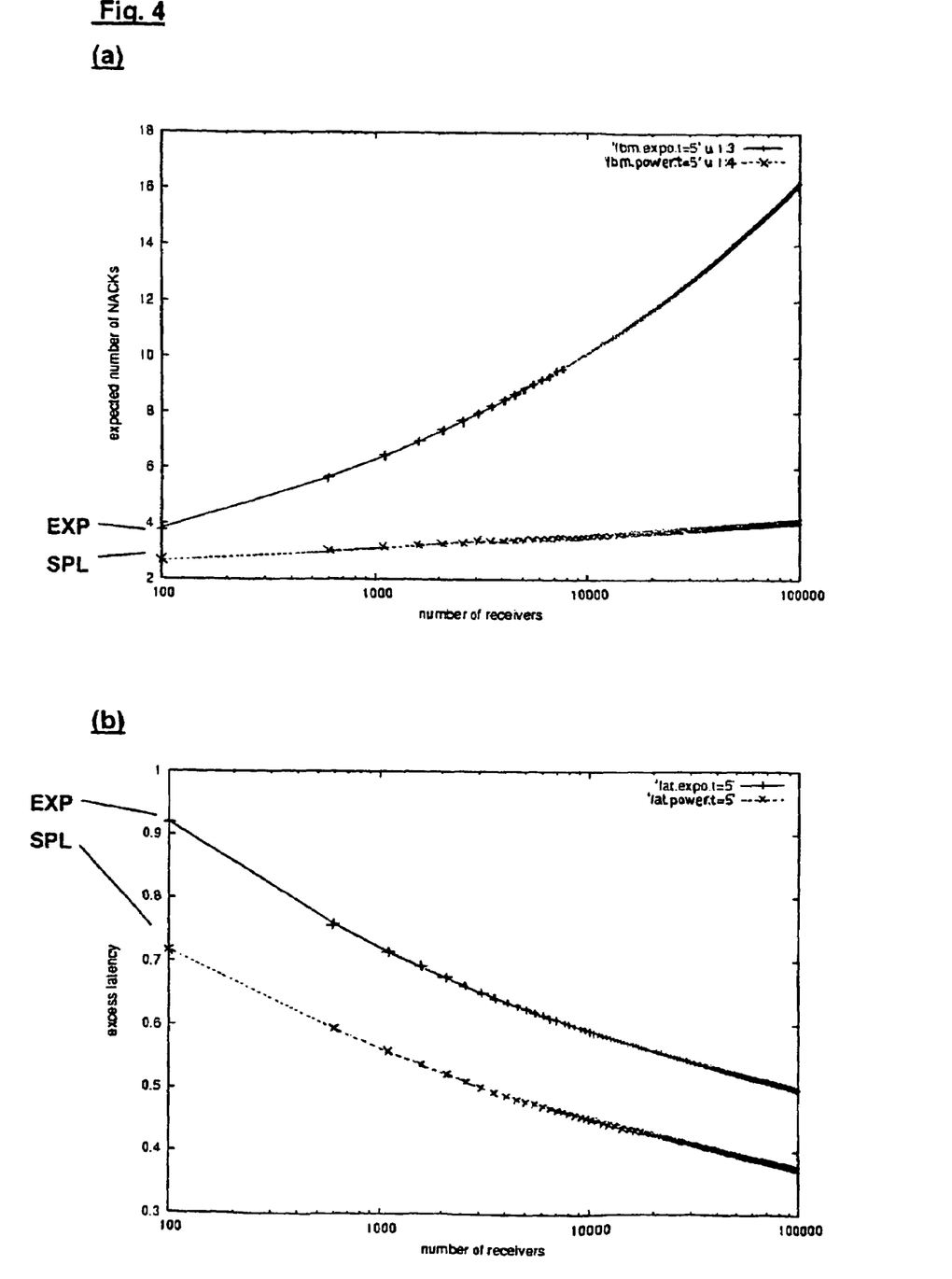

FIG. 4 shows graphs of the comparative expected performance during reliable multicast of these two timers when optimised to minimise the number of NACKs with no latency constraints (i.e. setting w=0) for multicast groups of up to $10^5$ receivers. FIG. 4(a) shows how the expected number of NACKs varies with the number of receivers for the optimised shifted power-law (SPL) and exponential (EXP) timers, with T=5c. FIG. 4(b) shows the corresponding values for the excess latency (in units of network delay time c). FIG. 4 shows that the shifted power-law timer outperforms the exponential timer here, resulting in both a lower number of expected NACKs and also a lower excess latency. In fact, this improved performance is most significant for small timer periods of the order of T=5c, and since excess latency decreases with the timer period it is generally desirable to set T as small (while constrained by T>c as discussed earlier).

Figure 5:
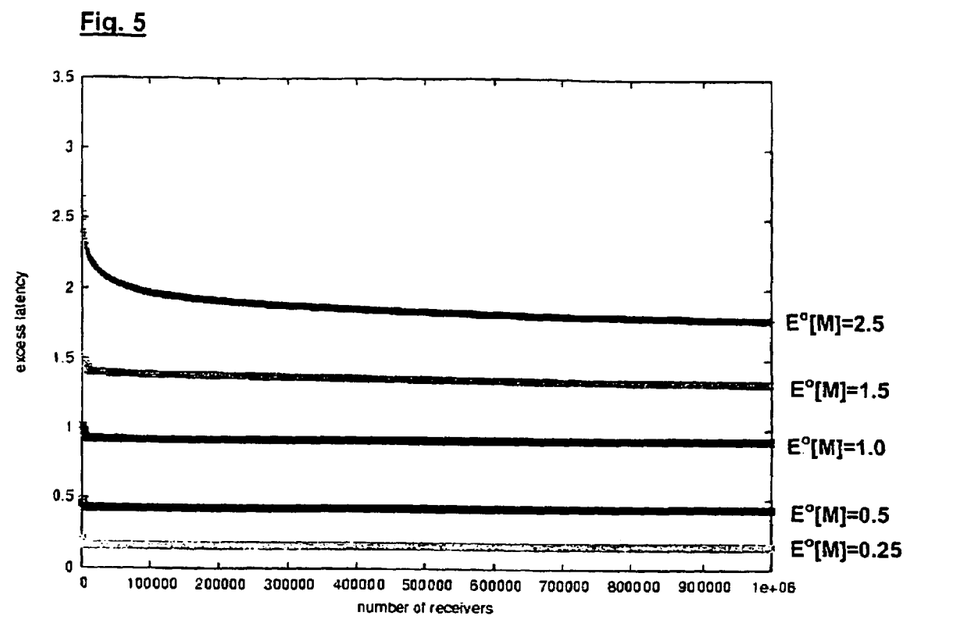
FIG. 5 is a graph showing the expected performance in reliable multicast of a shifted power law timer function optimised under different latency constraints.

FIG. 5 shows the expected performance of the optimised shifted power law timer in the situation where minimum NACK feedback is required under maximum tolerable excess latency values $E^0[M]=0.25,0.5,1.0,1.5,2.5$ (the latency is in units of network delay c). A system of up to $R=10^6$ receivers was considered, with the timer period fixed at T=10c. From the graph it is clear that the optimised timer was able to achieve the required latency. In addition, the timer was able to achieve very efficient NACK suppression, with the corresponding number of NACKs always remaining below 8 (not shown).

As discussed earlier, when using timer-based NACK suppression in reliable multicast, a tradeoff exists between the acceptable number of feedback messages and the excess latency. The desired balance between these will depend upon various implementation details such as the sender's capacity to handle feedback, the maximum available bandwidth and specific latency requirements of the mulitcast application. Although it is possible to achieve some tradeoff by adjusting the timer period, T cannot be freely adjusted as it must be chosen to be at least as large as the network delay time c, and preferably should be larger than the sender-receiver greatest round trip time (GRTT). The methods and apparatus described herein advantageously allow for optimum tradeoff between feedback suppression and excess latency without the need to adjust T.

Figure 6:
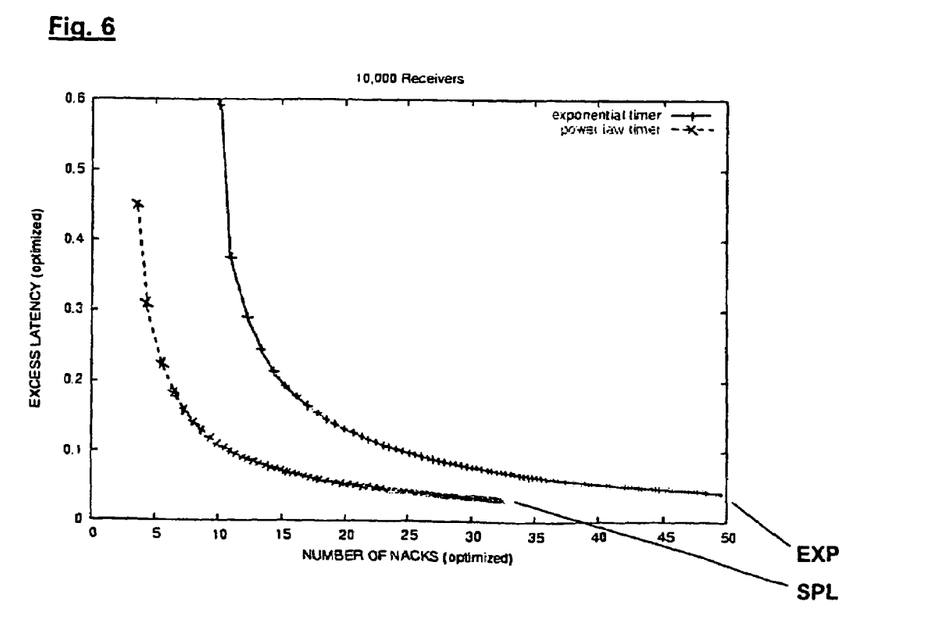
FIG. 6 is a graph showing the expectged relative performance in reliable multicast of two optimised timer functions, showing the expected excess latency versus number of NACKs.

FIG. 6 shows the comparative expected performance in reliable multicast of the shifted power law (SPL) and exponential (EXP) timer functions optimised using a range of w from 0 to 1000. This graph shows a plot of the excess latency versus the corresponding number of NACKs for a group of 10,000 receivers for both SPL and EXP timers. Minimisation of the objective function $\Omega$ in which $\Theta(E[M])$ is replaced simply by $E[M]$ was performed, using varying values of w from 0 to 1000 (which corresponds to moving along the curves plotted). Varying the value of the weighting term w corresponds to shifting the relative importance of the latency concern versus the NACK suppression. One possible method of parameter optimisation involves defining specific values of w for different types of multicast application, and then when the optimisation is performed selecting the appropriate value of w according to the multicast application in question.

Figure 7:
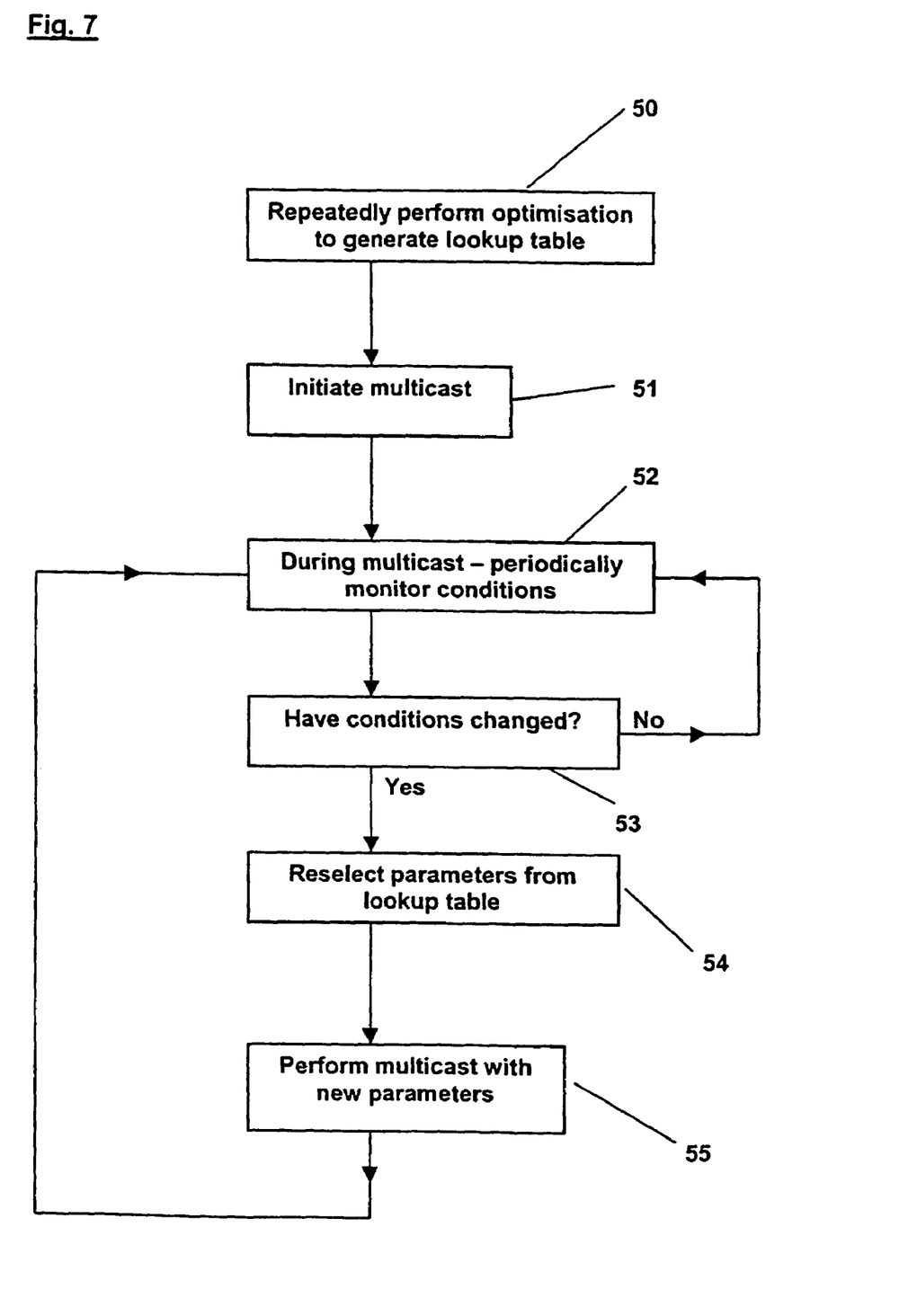
FIG. 7 is a flowchart showing the steps peformed by a multicast system, according to a second embodiment of the invention.

A second embodiment is now described with reference to FIG. 7. In this multicast system, a first step 50 involves generating a lookup table by repeatedly performing the timer function optimization as described with reference to FIG. 2, using various different input conditions and constraints. The look-up table may be generated either by the sender itself before multicast commences, or alternatively pre-computed on an external computing system and stored on an electronic storage device accessible by the sender. The stored optimised parameters in the lookup table are associated with the relevant input conditions and multicast constraints for which they were generated (for example different parameters may be stored in relation to different group sizes R, or for different types of multicast application). In addition, where there is a choice of timer function the lookup table also stores an indication of which timer function is to be used in a particular situation.

Multicast is intiated (step 51) by the sender selecting from the lookup table the appropriate timer parameters, which will depend on the type of multicast application and anticipated group dynamics. The selected parameters (and indication of which timer function to use, if appropriate) are sent by the sender to the receivers in transmitted multicast messages. During multicast, the sender periodically monitors the multicast conditions (step 52). At step 53 a test is applied to determine whether specific multicast conditions have changed by a predefined amount. If not, processing returns to step 52 until the next periodic check is performed during multicasting. However, if the multicast conditions have changed then the optimum timer parameters are re-selected from the lookup table in relation to the updated conditions (step 54). The newly selected parameters are then fed back into the multicast for use during the next round (step 55).

The implementation of the second embodiment is more efficient during run time than the first embodiment since no re-calculation of the timer parameters has to be peformed during multicast, they just have to be re-selected from the lookup table. Accordingly, if it is likely that the multicast conditions will change rapidly, for example if group size R rapidly increases or decreases, then the second embodiment will be preferable.

A third alternative embodiment comprises a general-purpose computer not itself forming part of a multicast system, running the same processing stages as described and illustrated earlier with reference to FIG. 2. This might be used as a modelling tool by, for example, multicast protocol designers, who would enter the required input information, such as the estimates for R and GRTT, using a suitable known input device, such as a keyboard. Processing stage 30 is performed by the processor of the computer, with the optimised solution output at step 31 via any suitable output device, such as a display screen, or saved to an electronic storage device. The computer of the third embodiment would be used as a tool for either investigating feedback suppression or designing/testing an optimum timer function. This would allow the user, who may be a multicast protocol designer, to optimise the parameters for any arbitrary timer they wish to test, or alternatively to compare the performance of a number of different timer distribution functions they input. Once optimization has been performed, the output solution may be utilised within a suitable multicast protocol.

It is desirable that not only the expected number of NACKs is kept low but also that fluctuations of NACKs around the expected value are small. Fortunately, the total number of feedback messages $$X = \sum_i X_i$$

has a binomial distribution, whose variance is given by $$\mathrm{var}[X] = E[X]\left(1 - \frac{E[X]}{R}\right)$$

Hence minimization of E[X] simultaneously results in minimization of the fluctuations in the number of NACKs.

As discussed earlier, the function $\Theta(E[M])$ relating to excess latency was a monotonically increasing function that rises sharply about $E^0[M]$. An alternative function having the desired behaviour could be used, such as the incomplete Beta function function) I(E[M]/T,a,b), with a and b two adjustable parameters (a,b>1) of the incomplete beta function satisfying $$\frac{a}{a+b} = E^0[M]/T$$

Whilst the methods and apparatus described herein have so far related to multicast in which the feedback channels are also multicast, alternative embodiments include a system in which there is no multicast connectivity between the receiver group. For example, unicast feedback channels having only a single logical direction back to the sender would include satellite networks using a terrestrial unicast feedback channel. Feedback supression can occur by either the sender forwarding (by multicast) any NACKs it receives or alternatively multicasting some other indication that a repair request has been received. In the event that a receiver detects either of these before it's backoff time expires then it will suppress it's own feedback. In this type of system, the delay before the forwarded NACK or indication is detected by the other receivers will necessarily be longer (transmission time of the order of 2c) compared with when the receivers can directly detect NACKs multicast from other receivers. Simple modifications to the transmission times within the expressions for E[X] and E[M] can be made to account for these differences, together with a larger value for timer period T.

It will be understood by those skilled in the art that the apparatus that embodies the invention could be a general purpose device having software arranged to provide an embodiment of the invention. The device could be a single device or a group of devices and the software could be a single program or a set of programs. Furthermore, any or all of the software used to implement the invention can be contained on various transmission and/or storage mediums such as a floppy disc, CD-ROM, or magnetic tape so that the program can be loaded onto one or more general purpose devices or could be downloaded over a network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A method for sending information in a multicast system by selecting a value of one or more parameters of a timer function for use by a receiver for delaying feedback in the multicast system, the method comprising:

finding the one or more parameter values of a timer function for use in a receiver to delay feedback in a multicast communication system, which parameter values minimize an expression defined as a function of the parameters, the expression comprising at least two terms, where one term relates to the expected number of feedback messages generated by receivers in the multicast system and the second term relates to the expected extra latency of the feedback due to the timer function; and sending information over the multicast system together with the values of at least one of the found parameter values.

2. Apparatus for performing the method according to claim 1.

3. A multicast transmission system comprising apparatus according to claim 2.

4. A multicast sender for operating as part of the multicast transmission system defined in claim 3.

5. A multicast receiver for operating part of the multicast transmission system defined in claim 3.

6. A method of multicast transmission, comprising performing the method according to claim 1, and including within a multicast message the values of one or more parameters for the timer function and/or an indication of a selected timer function.

7. A method of multicast transmission according to claim 6, further comprising:

monitoring multicast conditions during multicast transmission;

in the event that the conditions change in a predefined way, repeating the step of finding the one or more parameter values which minimize an expression defined as a function of the parameters, the expression comprising at least two terms, where one term relates to the expected number of feedback messages generated by receivers in the multicast system and the second term relates to the expected extra latency of the feedback due to the timer function; and then sending the recalculated values of one or more parameters and/or indication of a selected timer function in a subsequent multicast message.

8. A method according to claim 7, where the multicast conditions comprise size of the group of receivers.

9. A method according to claim 1, where the second term has the form of a function having a maximum gradient corresponding to the extra latency E[M] being substantially equal to a predefined maximum acceptable extra latency.

10. A method according to claim 9, where the second term has the form of a monotonic function increasing with E[M].

11. A method of multicast transmission, comprising:
repeatedly performing the method according to claim 1 for varying input multicast conditions in order to select a value of one or more parameters and/or timer function associated with the input multicast conditions, where the expression is defined as a function of at least one input multicast condition;
storing the selected parameter values and/or an indication of a selected timer function in a lookup table together with an associated input multicast condition;
a sender transmitting multicast messages including values of one or more parameters and/or an indication of a selected timer function which have been extracted from the lookup table with reference to the associated multicast condition.

12. A method of multicast transmission according to claim 11, further comprising:
monitoring multicast conditions during multicast transmission;
in the event that the conditions change in a predefined way, extracting information associated with the changed multicast conditions from the lookup table,
the information comprising values of one or more parameters and/or an indication of a selected timer function; and
sending a subsequent multicast message including the extracted information.

13. A method according to claim 1, where the expression further comprises a third term for weighting relatively the first and second terms.

14. A method according to claim 1, where the second term has the form:

$$\Theta(E[M]) = 1 - \frac{1}{1 + \exp(\gamma(E[M] - E^0[M]))}$$

in which E[M] expresses the expected extra latency as a function of the timer function, and $E^0[M]$ is the maximum acceptable extra latency.

15. A method according to claim 1 in which a timer function is a shifted power-law (SPL) distribution function of the form:

$$f_{SPL}(t) = \begin{cases} \frac{b}{T} + (1-b)\frac{a}{T}\left(\frac{t}{T}\right)^{a-1}; & 0 \le t \le T \\ 0; & \text{otherwise} \end{cases}$$

in which both a and b are parameters and T is the timer period.

16. A tangible computer storage medium storing computer readable code representing instructions for causing a computer to perform the method according to the claim 1 when the instructions are executed by the computer.

17. A method for sending information in a multicast system by selecting a timer function for use by a receiver for delaying feedback in a multicast system, the method comprising:
for each of at least two timer functions for use by a receiver to delay feedback in a multicast communication system, minimizing with respect to one or more parameters of the timer function an expression comprising at least two terms, where one term relates to the expected number of feedback messages generated by receivers in the multicast system and the second term relates to the expected extra latency of the feedback due to the timer function;
comparing the values of the minimized expressions for the timer functions; and
sending information over the multicast system together with at least one parameter value corresponding to a minimized timer function expression.

* * * * *